US012769574B2

(12) United States Patent
Collins

(10) Patent No.: US 12,769,574 B2
(45) Date of Patent: Oct. 20, 2026

(54) AUTOMATED CONFIGURATION TRANSFER FOR CONTAINERIZED APPLICATIONS

(71) Applicant: SCHNEIDER ELECTRIC IT CORPORATION, Foxboro, MA (US)

(72) Inventor: Patrick Christopher Collins, Loughrea (IE)

(73) Assignee: SCHNEIDER ELECTRIC IT CORPORATION, Foxboro (MA)

( * ) Notice: Subject to any disclaimer, the term of this patent is extended or adjusted under 35 U.S.C. 154(b) by 503 days.

(21) Appl. No.: 18/368,686

(22) Filed: Sep. 15, 2023

(65) Prior Publication Data

US 2025/0094194 A1 Mar. 20, 2025

(51) Int. Cl.
*G06F 9/455* (2018.01)

(52) U.S. Cl.
CPC .................... *G06F 9/45558* (2013.01); *G06F 2009/45562* (2013.01)

(58) Field of Classification Search
CPC ....... G06F 9/45558; G06F 2009/45562; G06F 21/108; G06F 21/1087; G06F 21/105
USPC .............................................................. 718/1
See application file for complete search history.

(56) References Cited

U.S. PATENT DOCUMENTS 8,429,081 B1 * 4/2013 Dronamraju ............ G06F 21/10 705/902
8,763,159 B1 * 6/2014 Kobets ................. G06Q 50/184 726/31
9,811,806 B1 * 11/2017 Kuang .................. G06F 16/128
9,928,059 B1 * 3/2018 Sartor ........................ G06F 8/71
10,789,337 B1 * 9/2020 King ........................ G06F 21/10
2006/0235802 A1 * 10/2006 Cappio .................... G06F 21/10 705/59
2006/0282394 A1 * 12/2006 Jothipragasam ........ H04L 63/10 705/59

(Continued)

FOREIGN PATENT DOCUMENTS

WO 2007024450 A2 3/2007

OTHER PUBLICATIONS

Extended European Search Report from corresponding European Application No. 24200305.1 dated Feb. 5, 2025.

*Primary Examiner* — Adam Lee
(74) *Attorney, Agent, or Firm* — FIG. 1 Patents

(57) ABSTRACT

In one embodiment, a computer program product is described. The computer program product includes a non-transitory computer-readable storage medium storing instructions, which when performed by processing circuitry of a set of one or more computing devices, cause the set of computing devices to configure a new containerized application operating in a first container to replace an old containerized application operating in a second container. This configuration includes (a) the new containerized application receiving a license identifier (ID) of a licensing service, the license ID being associated with the old containerized application; (b) sending an instruction directing the old containerized application to dissociate with the license ID; and (c) in response to the old containerized application dissociating with the license ID, associating the new containerized application with the license ID to become licensed with the licensing service. A related method, apparatus, and system are also described.

20 Claims, 2 Drawing Sheets

(56) References Cited

U.S. PATENT DOCUMENTS

| | | | | |
|---|---|---|---|---|
| 2009/0209314 | A1* | 8/2009 | Rybak | G06F 21/105 463/20 |
| 2009/0228982 | A1 | 9/2009 | Kobayashi | |
| 2011/0030066 | A1* | 2/2011 | Nakazawa | G06Q 30/06 726/26 |
| 2011/0179268 | A1* | 7/2011 | Strom | H04L 9/3247 713/168 |
| 2011/0289003 | A1* | 11/2011 | Womack | G06F 21/105 705/310 |
| 2012/0210442 | A1* | 8/2012 | Ito | G06F 21/121 726/26 |
| 2013/0057896 | A1* | 3/2013 | Ito | G06K 15/4095 358/1.14 |
| 2013/0133080 | A1* | 5/2013 | Yuki | G06F 21/10 726/27 |
| 2014/0109237 | A1* | 4/2014 | Novick | G06F 21/1073 726/27 |
| 2014/0189671 | A1* | 7/2014 | Dujmovic | G06F 16/245 717/168 |
| 2014/0207909 | A1 | 7/2014 | Yellai et al. | |
| 2016/0012210 | A1* | 1/2016 | Takemoto | G06F 21/10 726/28 |
| 2016/0099943 | A1* | 4/2016 | Roberts | H04W 12/08 726/3 |
| 2016/0142511 | A1* | 5/2016 | Smith | G06Q 30/06 709/223 |
| 2016/0182315 | A1* | 6/2016 | Salokanto | H04L 41/5054 709/226 |
| 2016/0301676 | A1* | 10/2016 | Gounares | H04L 63/0428 |
| 2017/0019551 | A1* | 1/2017 | Ge | H04N 1/00941 |
| 2017/0262825 | A1* | 9/2017 | Conway | G06F 21/105 |
| 2018/0191782 | A1* | 7/2018 | Djordjevic | H04L 63/0853 |
| 2018/0260536 | A1* | 9/2018 | Peza Ramirez | G06F 21/105 |
| 2018/0260541 | A1* | 9/2018 | Riscutia | H04L 9/3247 |
| 2019/0075080 | A1* | 3/2019 | Entezari | H04L 63/061 |
| 2019/0278887 | A1* | 9/2019 | Ramanujam | G06F 9/455 |
| 2019/0370436 | A1* | 12/2019 | Karademir | G06F 9/45558 |
| 2019/0373526 | A1* | 12/2019 | Chow | H04L 45/28 |
| 2021/0049002 | A1* | 2/2021 | Myers | G06F 9/44505 |
| 2021/0117308 | A1* | 4/2021 | Burgos | G06N 20/00 |
| 2021/0286640 | A1* | 9/2021 | Zengerle | G06F 16/1734 |
| 2021/0294624 | A1* | 9/2021 | Gray | G06F 8/654 |
| 2021/0349747 | A1* | 11/2021 | Albasheir | G06F 11/302 |
| 2021/0365247 | A1* | 11/2021 | Fletcher | G06F 9/5072 |
| 2021/0374215 | A1* | 12/2021 | Nissen | G06F 21/121 |
| 2022/0075546 | A1* | 3/2022 | Potyraj | G06F 11/2048 |
| 2022/0083325 | A1* | 3/2022 | Yu | G05B 19/4184 |
| 2022/0171863 | A1* | 6/2022 | Green | G06F 21/87 |
| 2022/0188170 | A1* | 6/2022 | Smith | G06F 9/5077 |
| 2023/0087341 | A1* | 3/2023 | Zheng | H04W 28/22 370/329 |
| 2023/0205647 | A1* | 6/2023 | Sharma | G06F 11/2025 714/15 |
| 2024/0248739 | A1* | 7/2024 | Ibrahim | G06F 9/5077 |
| 2024/0320057 | A1* | 9/2024 | Dunne | G06F 9/5005 |
| 2024/0362078 | A1* | 10/2024 | Gallagher | G06F 9/5027 |
| 2025/0061009 | A1* | 2/2025 | Wang | G06F 8/65 |
| 2025/0209139 | A1* | 6/2025 | Neifer | G06F 21/1014 |

* cited by examiner

AUTOMATED CONFIGURATION TRANSFER FOR CONTAINERIZED APPLICATIONS

BACKGROUND

Many software applications run within containers, such as virtual machines (VMs). In order to install these containerized applications, a pre-packaged VM image containing both application software and an operating system may be copied onto a server.

SUMMARY

In one embodiment, a computer program product is described. The computer program product includes a non-transitory computer-readable storage medium storing instructions, which when performed by processing circuitry of a set of one or more computing devices, cause the set of computing devices to configure a new containerized application operating in a first container to replace an old containerized application operating in a second container. This configuration includes (a) the new containerized application receiving a license identifier (ID) of a licensing service, the license ID being associated with the old containerized application; (b) sending an instruction directing the old containerized application to dissociate with the license ID; and (c) in response to the old containerized application dissociating with the license ID, associating the new containerized application with the license ID to become licensed with the licensing service.

In one embodiment, a method of configuring a new containerized application operating in a first container to replace an old containerized application operating in a second container is described. The method, performed by a set of one or more computing devices, includes (a) the new containerized application receiving a license identifier (ID) of a licensing service, the license ID being associated with the old containerized application; (b) sending an instruction directing the old containerized application to dissociate with the license ID; and (c) in response to the old containerized application dissociating with the license ID, associating the new containerized application with the license ID to become licensed with the licensing service.

In one embodiment, a computer program product is described. The computer program product includes a non-transitory computer-readable storage medium storing instructions, which when performed by processing circuitry of a set of one or more computing devices, cause the set of computing devices to operate a licensing service to: (I) receive a dissociation request from an old containerized application operating in a first container to dissociate with a license ID; (II) in response to receiving the dissociation request, dissociate the license ID from the old containerized application; (III) receive an association request from a new containerized application operating in a second container to associate with the license ID; and (IV) in response to receiving the association request, associate the license ID with the new containerized application.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Conventional containerized applications, as described above, may suffer from various limitations. For example, when a conventional containerized application is upgraded, a new image is installed, but various configuration details need to be transferred over from the previous version manually. This process can be especially tedious in the case of the configuration details for a software license, Thus, it would be desirable to implement an automated installation tool to allow configuration details, including a license identifier (ID), to be automatically transferred from an old (not yet upgraded) version of a containerized application to a new version of the containerized application during the installation process. In the case of a license ID, this may be accomplished by sending an instruction to the old containerized application directing it to dissociate itself from its license ID prior to the new containerized application associating itself with that license ID.

Figure 1:
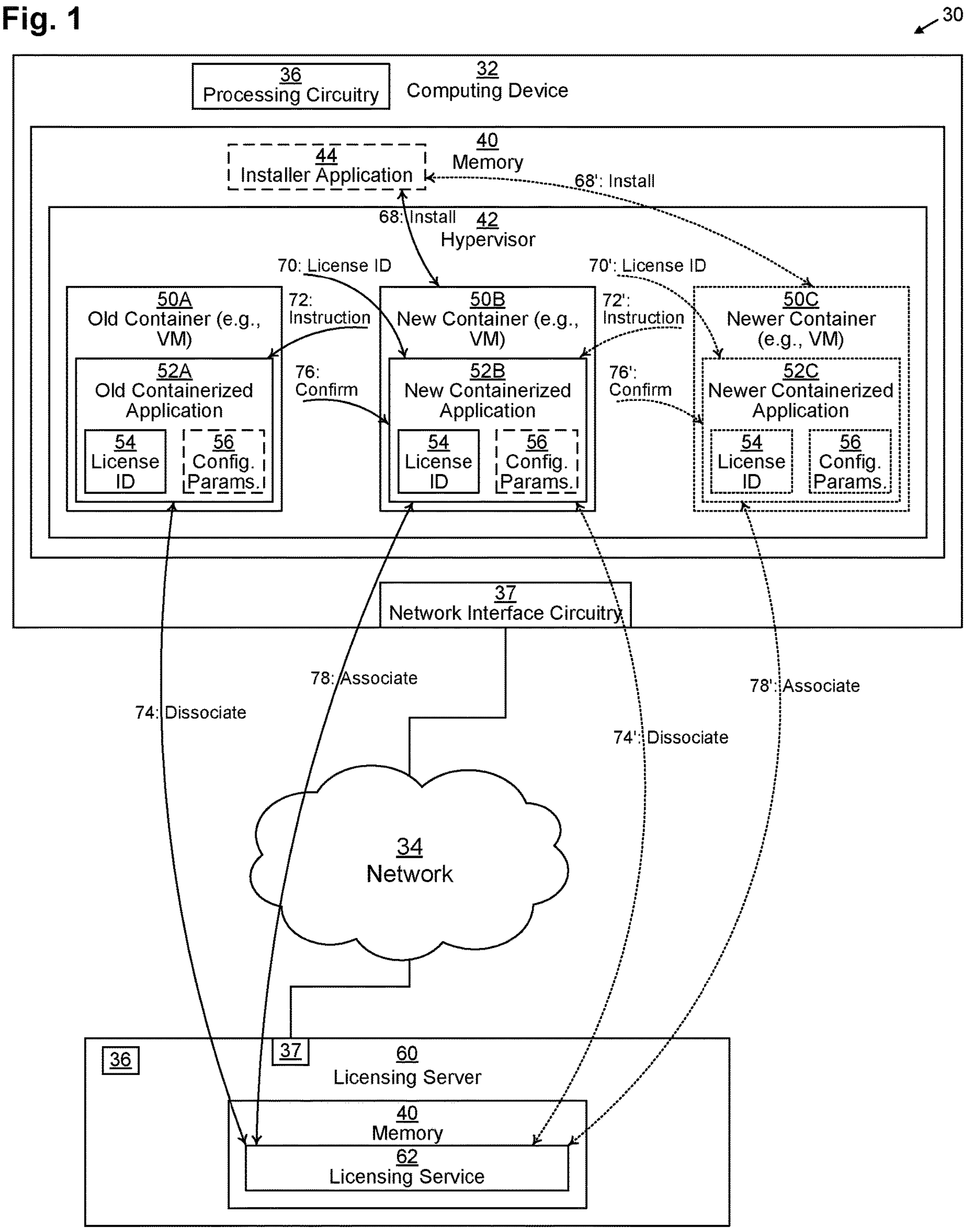
FIG. 1 illustrates an example system, apparatuses, computer programs, and data structures for use in connection with one or more embodiments.

FIG. 1 depicts an example system 30 for use in connection with various embodiments.

System 30 includes at least one computing device 32 connected to a licensing server 60 over a network 34. Each computing device 32 may be any kind of computing device, such as, for example, a personal computer, laptop, workstation, server, enterprise server, tablet, smartphone, router, etc. In an example embodiment, computing device 32 is a virtualization server.

Network 34 may be any kind of communications network or set of communications networks, such as, for example, a LAN, WAN, SAN, the Internet, a wireless communication network, a virtual network, a fabric of interconnected switches, etc.

Computing device 32 includes network interface circuitry 37, processing circuitry 36, and memory 40. Computing device 32 may also include various additional features as is well-known in the art, such as, for example, user interface circuitry, interconnection traces and buses, etc.

Network interface circuitry 37 may include one or more Ethernet cards, cellular modems, Fibre Channel (FC) adapters, InfiniBand adapters, wireless networking adapters (e.g., Wi-Fi), and/or other devices for connecting to a network 31.

Processing circuitry 36 may include any kind of processor or set of processors configured to perform operations, such as, for example, a microprocessor, a multi-core microprocessor, a digital signal processor, a field-programmable gate array (FPGA), a system on a chip (SoC), a collection of electronic circuits, a similar kind of controller, or any combination of the above.

Memory 40 may include any kind of digital system memory, such as, for example, random access memory (RAM). Memory 110 stores an operating system (OS, not depicted, e.g., a Linux, UNIX, Windows, MacOS, or similar operating system) and various drivers and other applications and software modules configured to execute on processing circuitry 104 as well as various data.

Memory 40 stores a hypervisor 42 configured to operate on processing circuitry 36.

Hypervisor 42 operates to run a set of containers 50, such as virtual machines (VMs), at least including an old container 50A and a new container 50B. Each container 50 may include an operating system (OS, not depicted, e.g., a Linux, UNIX, Windows, MacOS, or similar OS), at least one application 52, and various drivers and software modules configured to execute on processing circuitry 36 as well as various data. Old container 50A includes an old containerized application 52A, and new container 50B includes a new containerized application 52B.

Each containerized application 52 stores a license ID 54 provided by a licensing service 62 (e.g., operating on a licensing server 60). The license ID 54 is uniquely associated by the licensing service 62 with a particular containerized application 52, authorizing that containerized application 62 to run. Each containerized application 52 may also store various other configuration parameters 56.

In some embodiments, memory 40 of the computing device 32 may also store an installer application 44 that also runs on the processing circuitry 36.

It should be understood that although the installer application 44, old container 50A, and new container 50B are all depicted on the same computing device 32, that is by way of example only. In other embodiments (not depicted), one or more of the installer application 44, old container 50A, and new container 50B may operate on separate computing devices 32 linked together by network 34.

Licensing server 60 may be any kind of computing device, such as, for example, a personal computer, laptop, workstation, server, enterprise server, tablet, smartphone, router, etc.

In an example embodiment, computing device 32 is a server. Licensing server 60 may also include network interface circuitry 37, processing circuitry 36, and memory 40. Computing device 32 may also include various additional features as is well-known in the art, such as, for example, user interface circuitry, interconnection traces and buses, etc.

In operation a user or the installer application 44 may initiate installation 68 of new container 50B and its new containerized application 52B on hypervisor 42 to replace old containerized application 52A running on old container 50A. In an embodiment, new containerized application 52B is a newer version of the same software as the old containerized application 52A having more advanced or upgraded code and features. For example, the old containerized application 52A and the new containerized application 52B may both be network shutdown applications.

New containerized application 52B obtains (step 70) the license ID 54 from the old containerized application 52A. In some embodiments, step 70 may be performed by old containerized application 52A directly sending the license ID 54 to the new containerized application 52B in response to the new containerized application 52B requesting the license ID 54 from the old containerized application 52A (e.g., an idempotent request such as an HTTP GET command). In other embodiments, step 70 may be performed by installer application 44 obtaining the license ID 54 (e.g., by requesting it from the old containerized application 52A) and the installer application 44 sending the license ID 54 to the new containerized application 52B. In some embodiments, step 70 may also include the new containerized application 52B receiving the configuration parameters 56 used by the old containerized application 52A (either directly from the old containerized application 52A or via the installer application 44), which the new containerized application 52B is then able to implement within itself.

Subsequently, in step 72, old containerized application 52A receives an instruction to dissociate from the license ID 54. In some embodiments, step 72 may be performed by new containerized application 52B directly sending the instruction to the old containerized application 52A in response to receiving the license ID 54. In other embodiments, step 72 may be performed by installer application 44 sending the instruction to the old containerized application 52A after sending the license ID 54 to the new containerized application 52B.

Subsequently, in step 74, old containerized application 52A dissociates itself (step 74) from the license ID 54 by sending a dissociation request to the licensing service 62. Once this is completed, a confirmation 76 of the dissociation is sent to the new containerized application 52B. In some embodiments, confirmation 76 may be directly sent by old containerized application 52A to the new containerized application 52B. In other embodiments, confirmation 76 may be sent by installer application 44 to the new containerized application 52B.

In response to receiving the confirmation 76 of the dissociation, new containerized application 52B associates itself (step 78) with the license ID 54 by sending an association request to the licensing service 62. In response, the licensing service 62 registers the license ID 54 with the new containerized application 52B.

FIG. 1 also depicts, using dotted lines, an even newer containerized application 52C being installed within an even newer container 50C to replace the new containerized application 52B running within new container 50B.

A user or the installer application 44 may initiate installation 68' of newer container 50C and its newer containerized application 52C on hypervisor 42 to replace new containerized application 52B running on new container 50B. In an embodiment, newer containerized application 52C is a newer version of the same software as the new containerized application 52B having more advanced or upgraded code and features.

Newer containerized application 52C obtains (step 70') the license ID 54 from the new containerized application 52B. In some embodiments, step 70' may be performed by new containerized application 52B directly sending the license ID 54 to the newer containerized application 52C in response to the newer containerized application 52C requesting the license ID 54 from the new containerized application 52B (e.g., an idempotent request such as an HTTP GET command). In other embodiments, step 70' may be performed by installer application 44 obtaining the license ID 54 (e.g., by requesting it from the new containerized application 52B) and the installer application 44 sending the license ID 54 to the newer containerized application 52C. In some embodiments, step 70' may also include the newer containerized application 52C receiving the configuration parameters 56 used by the new containerized application 52B (either directly from the new containerized application 52B or via the installer application 44), which the new containerized application 52B is then able to implement within itself.

Subsequently, in step 72', new containerized application 52B receives an instruction to dissociate from the license ID 54. In some embodiments, step 72' may be performed by newer containerized application 52C directly sending the instruction to the new containerized application 52B in response to receiving the license ID 54. In other embodiments, step 72' may be performed by installer application 44 sending the instruction to the new containerized application 52B after sending the license ID 54 to the newer containerized application 52C.

Subsequently, in step 74', new containerized application 52B dissociates itself (step 74') from the license ID 54 by sending a dissociation request to the licensing service 62. Once this is completed, a confirmation 76' of the dissociation is sent to the newer containerized application 52C. In some embodiments, confirmation 76' may be directly sent by new containerized application 52B to the newer containerized application 52C. In other embodiments, confirmation 76' may be sent by installer application 44 to the newer containerized application 52C.

In response to receiving the confirmation 76' of the dissociation, newer containerized application 52C associates itself (step 78') with the license ID 54 by sending an association request to the licensing service 62. In response, the licensing service 62 registers the license ID 54 with the newer containerized application 52C.

Memory 40 may also store various other data structures used by the OS, hypervisor 42, installer application 44, old containerized application 52A, new containerized application 52B, newer containerized application 52C, licensing service 62, and/or various other applications and drivers. In some embodiments, memory 40 may also include a persistent storage portion.

Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 32 or licensing server 60 is powered off. The OS, hypervisor 42, installer application 44, old containerized application 52A, new containerized application 52B, newer containerized application 52C, licensing service 62, and/or various other applications and drivers are typically stored in this persistent storage portion of memory 40 so that they may be loaded into a system portion of memory 40 upon a system restart or as needed.

The OS, hypervisor 42, installer application 44, old containerized application 52A, new containerized application 52B, newer containerized application 52C, licensing service 62, and/or various other applications and drivers, when stored in non-transitory form either in the volatile or persistent portion of memory 40, each form a computer program product. The processing circuitry 36 running one or more applications thus forms a specialized circuit constructed and arranged to carry out the various processes described herein.

Figure 2:
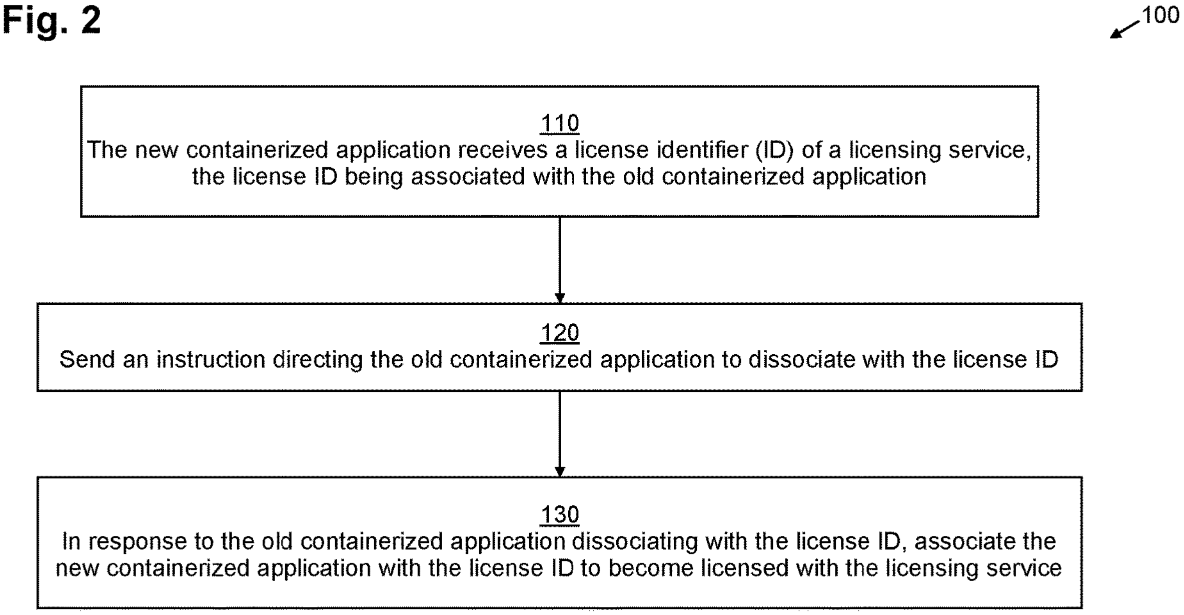
FIG. 2 illustrates an example method for use in connection with one or more embodiments.

FIG. 2 illustrates an example method 100 performed by one or more computing devices 32 for configuring a new containerized application 52B operating in a new container 50B to replace an old containerized application 52A operating in an old container 50A. It should be understood that any time a piece of software (e.g., OS, installer application 44, hypervisor 42, old containerized application 52A, new containerized application 52B, newer containerized application 52C, licensing service 62, etc.) is described as performing a method, process, step, or function, what is meant is that a computing device (e.g., computing device 32, licensing server 60, etc.) on which that piece of software is running performs that method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order.

In step 110, the new containerized application 52B receives the license ID 54, of the licensing service 62 (i.e., issued and/or managed by the licensing service 62) the license ID currently being associated with the old containerized application 52A. In some embodiments, the license ID is received by the new containerized application 52B from the installer application 44. In other embodiments, the license ID is received by the new containerized application 52B from the old containerized application 52A in response to the new containerized application 52B sending a request (e.g., an idempotent request such as an HTTP GET request) to the old containerized application 52A requesting the license ID 54.

In step 120, an instruction is sent directing the old containerized application 52A to dissociate with the license ID 54. In some embodiments, step 120 is performed by the new containerized application 52B in response to step 110. In other embodiments, step 120 is performed by the installer application 44.

In step 130, in response to the old containerized application 52A dissociating with the license ID 54 (e.g., as in step 78), the new containerized application 52B associates with the license ID 54 to become licensed with the licensing service 62. In some embodiments, step 130 is more particularly performed in response to the new containerized application 52B receiving the confirmation 76 from the containerized application 52A that it has successfully dissociated with the license ID 54.

Figure 3:
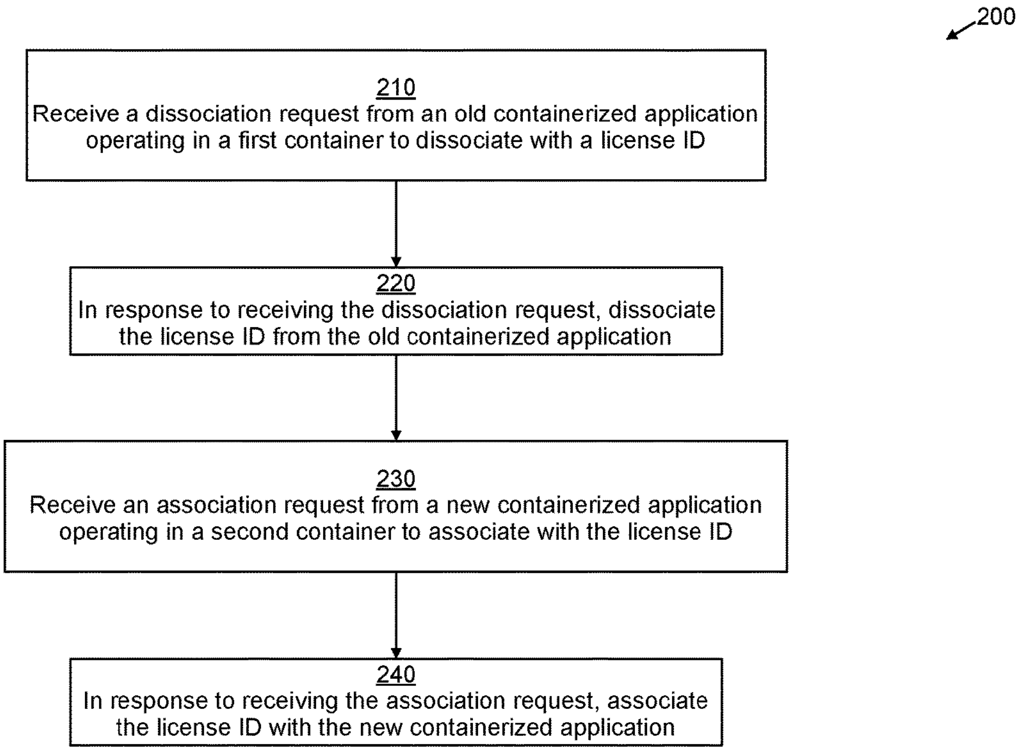
FIG. 3 illustrates an example method for use in connection with one or more embodiments.

FIG. 3 illustrates an example method 200 performed by a licensing server 60 for operating a licensing service 62 to configure a new containerized application 52B operating in a new container 50B to replace an old containerized application 52A operating in an old container 50A. It should be understood that one or more of the steps or sub-steps of method 200 may be omitted in some embodiments. Similarly, in some embodiments, one or more steps or sub-steps may be combined together or performed in a different order.

In step 210, licensing service 62 receives a dissociation request from a first containerized application 52 (e.g., old containerized application 52A, new containerized application 52B, etc.) operating within a first container (e.g., old container 50A, 50B, etc.) to dissociate with a license ID 54 managed by the licensing service 62. In response, in step 220, the licensing service 62 dissociates (e.g., unregisters) the license ID 54 from the first containerized application 52 (e.g., old containerized application 52A, new containerized application 52B, etc.).

In step 230, licensing service 62 receives an association request from a second containerized application 52 (e.g., new containerized application 52B, newer containerized application 52C, etc.) operating within a second container (e.g., new container 50B, 50C, etc.) to associate with the license ID 54. In response, in step 240, the licensing service 62 associates (e.g., registers) the license ID 54 with the second containerized application 52 (e.g., new containerized application 52B, newer containerized application 52C, etc.).

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicant makes no admission that such technique, method, apparatus, or other concept is actually prior art under 35 U.S.C. § 102 or 103, such determination being a legal determination that depends upon many factors, not all of which are known to Applicant at this time.

What is claimed is:

1. A computer program product comprising a non-transitory computer-readable storage medium storing instructions for configuring a new containerized application operating in a first container on a hypervisor of a set of computing devices to replace an old containerized application operating in a second container on the hypervisor, wherein the new containerized application is a newer version of the old containerized application, the instructions which, when executed by processing circuitry of the set of computing devices, cause the set of computing devices to:

initiate installation of the first container and the new containerized application on the hypervisor;

in response to receiving, from the new containerized application, a request for a license identifier (ID) of a licensing service, send the license ID from the old containerized application to the new containerized application, the license ID being associated with the old containerized application;

send an instruction to the old containerized application directing the old containerized application to dissociate from the license ID;

send a dissociation request from the old containerized application to the licensing service to cause the licensing service to dissociate the old containerized application from the license ID;

in response to dissociating the old containerized application from the license ID, send a confirmation from the old containerized application to the new containerized application to confirm that the old containerized application has dissociated from the license ID; and in response to the confirmation, associate the new containerized application with the license ID to license the new containerized application with the licensing service.

2. The computer program product of claim 1, wherein the instructions further cause the set of computing devices to:

in response to receiving, a from a newer containerized application, a second request for the license ID, send the license ID from the new containerized application to the newer containerized application, the license ID being associated with the new containerized application;

send the license ID from the new containerized application to the newer containerized application operating in a third container on the hypervisor to replace the new containerized application operating in the first container; and send a second instruction to the new containerized application directing the new containerized application to dissociate from the license ID, the second instruction causing the new containerized application to dissociate from the license ID via the licensing service.

3. The computer program product of claim 2, wherein the instructions further cause the set of computing devices to:

in response to dissociating the new containerized application from the license ID, send a second confirmation from the new containerized application to the newer containerized application to confirm that the new containerized application has dissociated from the license ID.

4. The computer program product of claim 1, wherein the request is an idempotent request.

5. The computer program product of claim 1, wherein the license ID is sent to the new containerized application from an installer application on the set of computing devices, the installer application having initiated the installation of the new containerized application.

6. The computer program product of claim 1, wherein the instructions to send the instruction to the old containerized application further cause the set of computing devices to:

send the instruction to the old containerized application from the new containerized application in response to receiving the license ID at the new containerized application.

7. The computer program product of claim 1, wherein the instructions to send the instruction to the old containerized application further cause the set of computing devices to:

send, from an installer application on the set of computing devices, the instruction to the old containerized application in response to receiving the license ID at the new containerized application, the installer application having initiated the installation of the new containerized application.

8. The computer program product of claim 1, wherein the instructions to associate the new containerized application with the license ID further cause the set of computing devices to:

in response to sending the confirmation to the new containerized application that the old containerized application has dissociated from the license ID, send an association request from the new containerized application to the licensing service to cause the licensing service to register the license ID with the new containerized application.

9. The computer program product of claim 1, wherein the instructions further cause the set of computing devices to cause the new containerized application to:

receive configuration parameters of the old containerized application; and implement the configuration parameters within the new containerized application.

10. The computer program product of claim 1, wherein the new containerized application and the old containerized application are network shutdown applications.

11. A method, executed by a set of computing devices, of configuring a new containerized application operating in a first container on a hypervisor of the set of computing devices to replace an old containerized application operating in a second container on the hypervisor, wherein the new containerized application is a newer version of the old containerized application, the method comprising:

initiating installation of the first container and the new containerized application on the hypervisor;

in response to receiving, from the new containerized application, a request for a license identifier (ID) of a licensing service, sending the license ID from the old containerized application to the new containerized application, the license ID being associated with the old containerized application;

sending an instruction to the old containerized application directing the old containerized application to dissociate from the license ID;

sending a dissociation request from the old containerized application to the licensing service to cause the licensing service to dissociate the old containerized application from the license ID;

in response to dissociating the old containerized application from the license ID, sending a confirmation from the old containerized application to the new containerized application to confirm that the old containerized application has dissociated from the license ID; and in response to the confirmation, associating the new containerized application with the license ID to license the new containerized application with the licensing service.

12. The method of claim 11, wherein the method further comprises:

in response to receiving, from a newer containerized application, a second request for the license ID, sending the license ID from the new containerized application to the newer containerized application, the license ID being associated with the new containerized application;

sending the license ID from the new containerized application to the newer containerized application operating in a third container on the hypervisor to replace the new containerized application operating in the first container; and sending a second instruction to the new containerized application directing the new containerized application to dissociate from the license ID, the second instruction causing the new containerized application to dissociate from the license ID via the licensing service.

13. The method of claim 12, wherein the method further comprises:

in response to dissociating the new containerized application from the license ID, sending a second confirmation from the new containerized application to the newer containerized application to confirm that the new containerized application has dissociated from the license ID.

14. The method of claim 12, wherein the request is an idempotent request.

15. The method of claim 11, wherein the license ID is sent to the new containerized application from an installer application on the set of computing devices, the installer application having initiated the installation of the new containerized application.

16. The method of claim 11, wherein sending the instruction to the old containerized application further comprises:

sending the instruction to the old containerized application from the new containerized application in response to receiving the license ID at the new containerized application.

17. The method of claim 11, wherein sending the instruction to the old containerized application further comprises:

sending, from an installer application on the set of computing devices, the instruction to the old containerized application in response to receiving the license ID at the new containerized application, the installer application having initiated the installation of the new containerized application.

18. A system for configuring a new containerized application operating in a first container to replace an old containerized application operating in a second container of a hypervisor of a set of computing devices, wherein the new containerized application is a newer version of the old containerized application, the system comprising:

the set of computing devices configured to:

initiate installation of the first container and the new containerized application on the hypervisor, in response to receiving, from the new containerized application, a request for a license identifier (ID) of a licensing service, send the license ID from the old containerized application to the new containerized application, the license ID being associated with the old containerized application, send an instruction to the old containerized application directing the old containerized application to dissociate from the license ID, send a dissociation request from the old containerized application to the licensing service, and in response to dissociating the old containerized application from the license ID, send a confirmation from the old containerized application to the new containerized application to confirm that the old containerized application has dissociated from the license ID; and a licensing server configured to execute the licensing service, the licensing server connected to the set of computing devices via a network, wherein the licensing service is configured to:

dissociate the old containerized application from the license ID in response to the dissociation request, receive an association request from the new containerized application to associate the new containerized application with the license ID, and in response to the confirmation and receiving the association request, associate the new containerized application with the license ID to license the new containerized application with the licensing service.

19. The system of claim 18, wherein in response to the confirmation, the licensing service is further configured to register the new containerized application with the license ID to license the new containerized application with the licensing service.

20. The system of claim 18, wherein the new containerized application and the old containerized application are network shutdown applications.

* * * * *